Fig.1

July 31, 1962 E. JABLONSKY 3,047,087
LIMITED MOTION POWER STEERING DEVICE
Filed July 10, 1959 9 Sheets-Sheet 4

Inventor:
Erich Jablonsky
by: Alberto Zalkind

Inventor:
Erich Jablonsky

July 31, 1962     E. JABLONSKY     3,047,087

LIMITED MOTION POWER STEERING DEVICE

Filed July 10, 1959     9 Sheets—Sheet 7

*Inventor:*
Erich Jablonsky
by: Albert M Zelkind

United States Patent Office 3,047,087
Patented July 31, 1962

3,047,087
LIMITED MOTION POWER STEERING DEVICE
Erich Jablonsky, Albstrasse 80, Schwabisch-
Gmund, Germany
Filed July 10, 1959, Ser. No. 826,372
Claims priority, application Germany July 18, 1958
11 Claims. (Cl. 180—79.2)

This invention relates to booster type steering and more particularly to a booster device actuated by oil presure responsive to rotation of a steering rod.

In prior booster devices of the oil pressure type, a drawback has been found to exist in that full oil pressure is maintained on the booster piston until it reaches the extreme limit of its stroke. As a result of this condition, heavy stress is placed upon the mechanical elements of the steering mechanism. The purpose of the present invention is to eliminate this drawback in an arrangement which will be relatively compact and simple, as well as economical to manufacture.

Briefly, my invention comprises an arrangement of auxiliary exhaust valves, one for each end of a double-acting booster piston cylinder wherein the valves are actuated to exhaust the respective cylinder end upon the piston reaching a predetermined point in its travel in either direction, such predetermined point being prior to the extreme limit of movement of the steering mechanism connected to the vehicle wheels. Thus, the final force for effecting steering to the extreme limit is manually effected, rather than power effected.

The particular invention herein to be described in detail takes several forms for use in conjunction with particular types of fluid pressure control as effected by rotation of the steering rod; for example, in my patent applications, S. N. 661,357, filed May 24, 1957, now Patent No. 2,941,-514 and S. N. 790,115 filed January 30, 1959, now Patent No. 2,975,764, both assigned to the present assignee, there are shown booster steering devices wherein rotation of the steering rod effects reciprocation of a sleeve valve within the booster piston. Thus, a threaded connection between the rod and the sleeve valve moves the valve to open and close various ports for controlling communication with the ends of the booster cylinder. However, manual steering force can be utilized in event of pressure failure.

While certain modifications of the invention disclosed herein are particularly adapted to use in conjunction with such types of main sleeve valve control, at least one other modification is intended for another type of main valve control which may be of any conventional form wherein input and outlet valves are actuated by a steering rod for the purpose of effecting reciprocation of a double-ended piston.

A detailed description of the invention will now be given in conjunction with the appended drawing in which.

Referring now to the drawing, and in particular FIGS. 1 through 4, the invention comprises a steering rod 1 which will be understood to have threaded connection with a sleeve valve 120 interiorly of the piston for effecting pressure control to either chamber 3 or 4 of a booster cylinder 14 having an integral double-acting piston therein provided with the piston heads 6 and 7 movable by pressure in the respective chambers 3 and 4.

Figure 1:
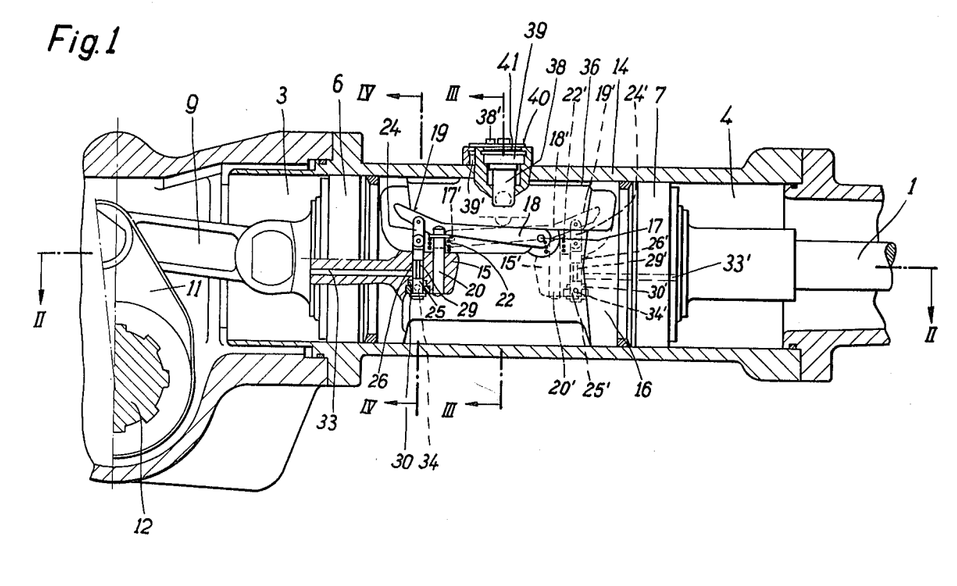
FIG. 1 is a longitudinal section through a booster steering mechanism showing such components as are essential to the present invention.

Connected to the booster piston is a connecting link 9 pivotally articulated intermediate the piston and the crank 11 in conventional fashion for rotating the steering shaft 12 of the steering mechanism.

Associated with the piston sections 6 and 7 (which are integral with the intermediate piston portion 16), and held by respective pivot pins 17, 17', are levers 18, 18' having respective upwardly bent portions to effect respective cam surfaces 19, 19'. Each of the levers is spring biased upwardly as by springs 22, 22' and is guided within a slot in the upper portion of the respective pins 20, 20'. The pins are firmly fixed within suitably provided bores in a portion of the piston casting, as shown. As noted by comparison of FIGS. 1 and 2, the levers 18, 18' are arranged for compactness in association with respective ends of the piston so that one lever swings clockwise and the other counterclockwise, the levers being pivoted at respective ends of the piston to the integrally cast portion 16 on projections 15 and 15' provided for that purpose. Each lever is associated with a reciprocal valve actuating rod through a respective link 24, 24' which is pivoted to the respective lever and the respective valve stem, as best seen on FIG. 4, for actuating respective valve pistons 25, 25', which rods are pivoted as by a pin to the respective levers adjacent the cam portions 19, 19'.

Thus, rocking of either lever effects control of a respective valve whereby fluid, for example from pressure chamber 3 or 4, may pass through respective exhaust passages 33 or 33' provided through the respective piston heads 6 and 7, thence to the respective recesses 29 or 29' which form part of the valve pistons. Each valve piston is reciprocal in a respective bore 26, 26' provided within projection 15 which is part of the integral piston section 16, as mentioned above.

Figure 4:
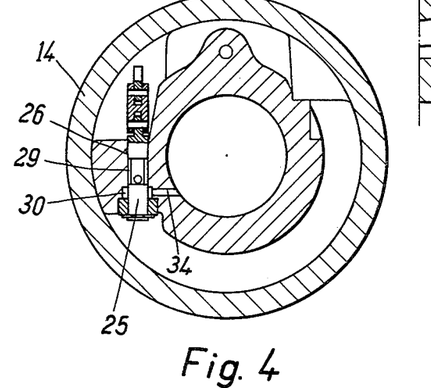
FIG. 4 is a section on the line IV—IV of FIG. 1.

As seen on FIG. 4, an exhaust passage 34 communicates from valve bore 26 to the center portion of the piston 16, thence into the bore 124 of the sleeve valve 120 (FIG. 1a) from which the oil flows through the bores 125, 126 and the space 127 back to the oil sump, all as presented in the prior-mentioned patent applications.

Figure 1A:
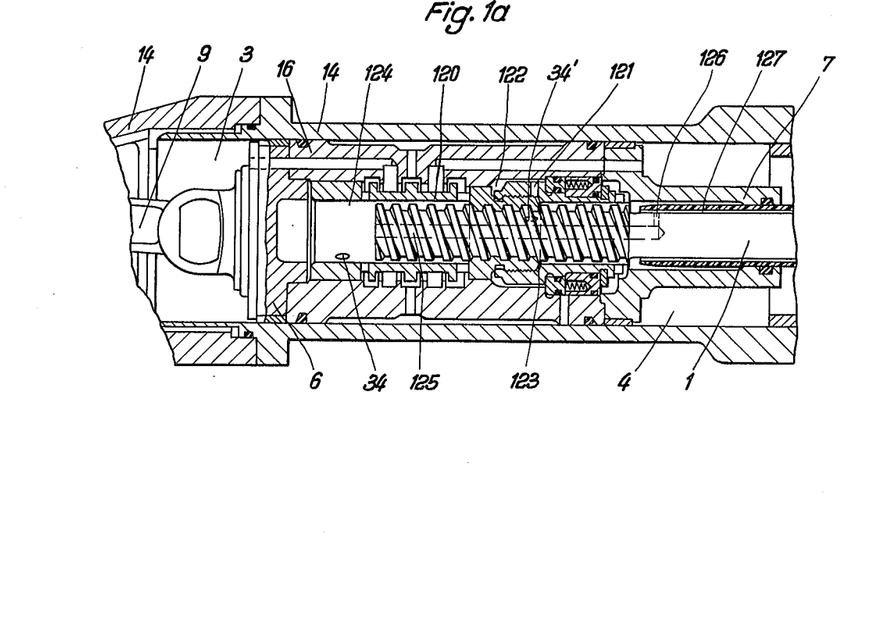
FIG. 1a is a section on the line I—I of FIG. 3.
Figure 2:
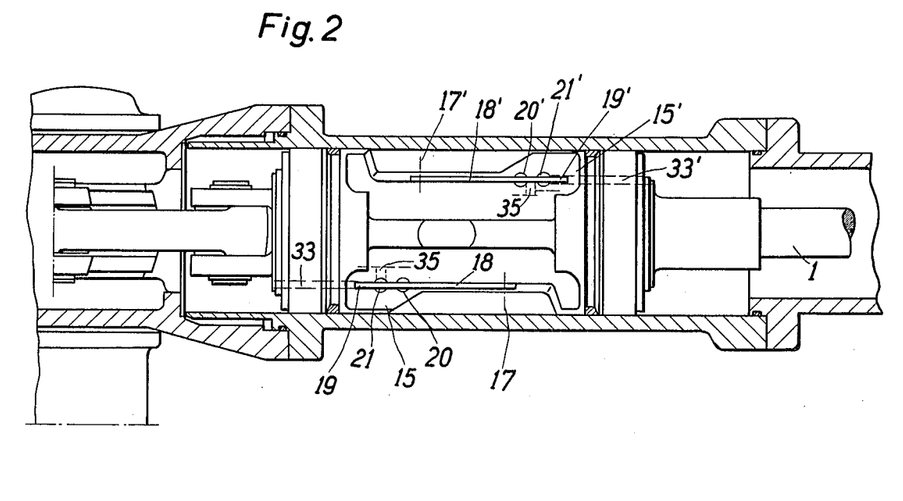
FIG. 2 is a section on the line II—II of FIG. 1.

The exhaust channel 34 finds its counterpart in channel 34' associated with valve 25', as will be noted on FIGS. 1 and 1a. The exhaust channel 34' communicates with the chamber 122, thence through bores 121, ring space 123 and back to the oil sump.

Figure 3:
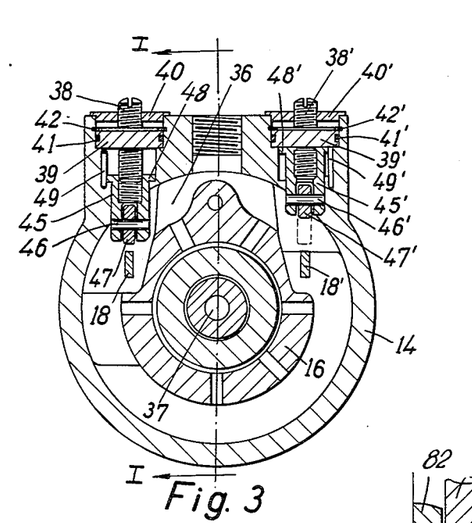
FIG. 3 is a section on the line III—III of FIG. 1.

Referring now to FIGS. 1 and 3, a stop element 38 is associated with the lever 18, while a similar stop element 38' is associated with the lever 18', or strictly speaking, with the respective cam portions 19 and 19', in a manner to be described. The stop element 38 comprises an adjustable screw firmly secured to a disk 39 which is supported on a shoulder in the housing and fixed against the shoulder by a retaining clip 42. Threadedly associated with the stop element 38 is a lock nut 40 which, as shown, can be tightened so as to jam against the top surface of a projection which is part of cylinder 14. Thus, by action of lock nut 40, the stop element 38 can be secured in any rotated position. At the lower portion of the stop element 38 is a sleeve or bushing 45, threadedly secured to element 38, which carries a roller 47 pivotally secured in the bifurcated lower end of the bushing as by a pin 46. A fixed pin 49 forms a key which will be understood to co-act with a notch in the flange 48 of bushing 45 to prevent rotation of the bushing when stop element 38 is rotated so that the bushing can be adjusted upwardly or downwardly. Thus, by loosening the lock nut 40, the kerfed end of element 38 may be rotated as by a screw driver for the purpose of raising or lowering bushing 45 so that the roller 47 may be disposed nearer to or farther from the lever 18, and in the plane thereof. Thus, as seen on FIG. 1, if the piston moves toward the right, the cammed portion 19 will engage roller 47. Such engagement will force lever 18 to rotate counter-clockwise and such rotation of the lever will push the valve piston portion 25 of the valve downwardly so as to open communication between channel 33 (FIG. 1) via recess 29, recess 30, and channel 34 (FIG. 4). This will, of course, permit fluid to pass from chamber 3 into the main exhaust channel which is comprised of the interior of the piston and/or the sleeve valve construction therein. Thus, it will be apparent that adjustment of the stopping element 38 may be made so that at any desired point of traverse of the piston in moving toward the right as viewed in FIG. 1, the respective valve 25 will be cracked in order to relieve pressure in chamber 3 and eliminate power boosting force on piston head 6. In a similar manner the cam portion 19' of lever 18' co-acts with a stop element 38' having all its immediately co-acting elements 39' through 49' identical to those described in connection with stop element 38. In other words, stop element 38' may be set so that, if the piston moves under power boost force toward the left, cam portion 19' will engage roller 47' at a desired point in the traverse of the piston to crack valve 25' and thus relieve pressure in chamber 4, whereupon no further power boosting force on piston head 7 is experienced.

From the above construction it will be noted that the arrangement is very compact and rugged and involves a narrowed central portion 16 of the piston for accommodation of parallel levers, each being pivoted to the piston at a respective end thereof and which, in conjunction with their respective valves, form a control system for opening either end of the cylinder to exhaust at a particular respective point of traverse in either direction of the piston, depending upon the setting of respective stop elements 38 and 38'.

Figure 5:
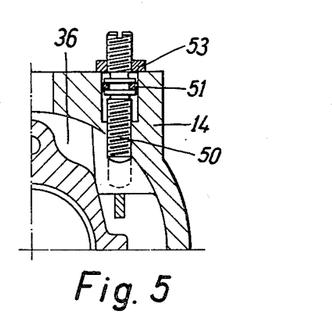
FIG. 5 shows a modification in cross-section of a certain component of the invention.

Referring to FIG. 5, a modification of the stop element arrangement is disclosed. In this instance the stop element consists of the pin 50 threadedly engaged within a bore of the cylinder 14 as shown, and having the sealing gasket 51 as shown, together with the lock nut 53 for holding stop element 50 in any adjusted position. Thus, the lower end of the element 50 is directly engageable by the lever and is disposed within the central pressure chamber 36.

Figure 6:
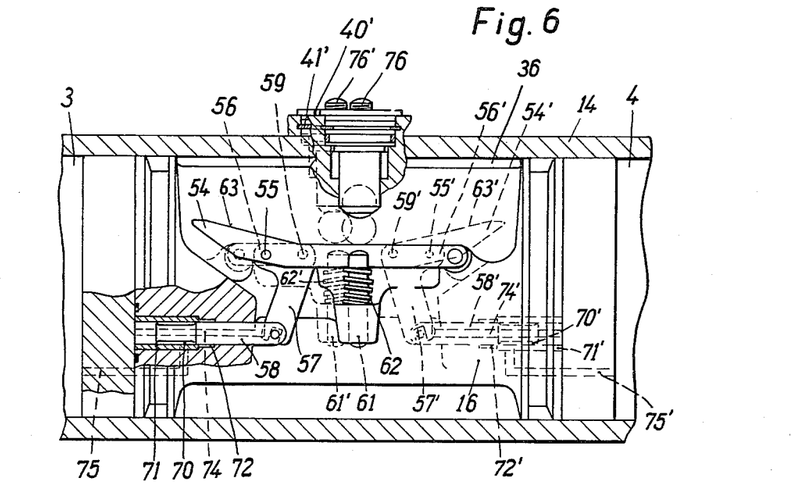
FIG. 6 is a cross-sectional view showing a modification of the combination of the invention.
Figure 7:
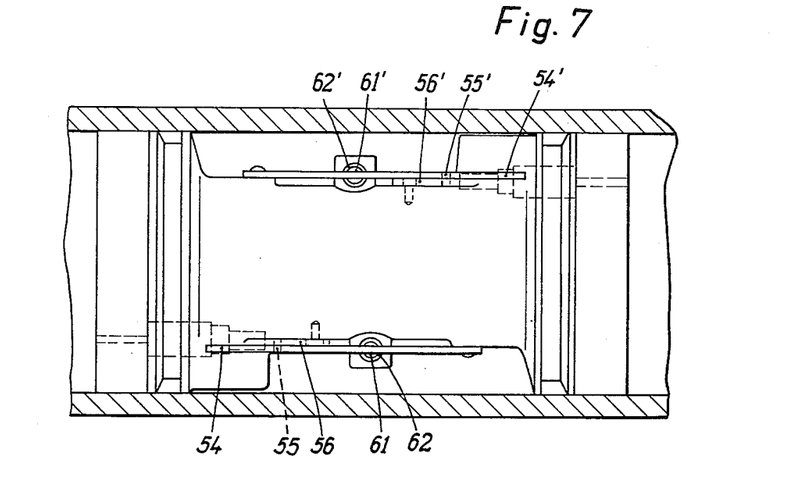
FIG. 7 is a plan view of the modification.

Referring now to the form of the invention shown in FIGS. 6 and 7, the general arrangement and principle of operation is similar to that described above except that, in this instance, the valves are horizontally arranged; that is, have their axes in parallel relation to the piston axis and are operated by compound lever arrangements involving bell cranks. The construction is well suited for compound booster steering apparatus involving small cylinders. Thus, bell crank levers 57 and 57' are articulated by pivot pins to the stems of valves 58 and 58' respectively. Each bell crank lever is pivoted to the piston as by a respective pin 59, 59'. An additional lever 54, 54' actuates each bell crank lever, said additional levers having the cam portions, respectively, 63 and 63', and being pivoted to the respective bell cranks as by pins 55 and 55'. Each additional lever is pivoted as shown to opposite sides of the piston body adjacent the ends thereof. Upward bias of each additional lever is maintained by a respective spring 62, 62' carried around a pin socketed within a respective support abutment 61, 61' of the piston. The upper ends of the pins are slotted as shown so as to straddle the lower edge of the respective levers and maintain the springs compressed between respective levers and respective abutments 61 and 61'.

From the foregoing, it will be apparent that pressure on the cam portions 63 and 63' will rock the respective levers 54, 54' and thus cause rocking of the respective bell crank levers 57, 57' in order to reciprocate the respective valves 58, 58' in the respective bushings 71, 71'.

The recesses 70, 70' connect to respective bores 75, 75' leading to the respective pressure chambers 3 and 4, and the valve bores have recesses 72, 72' respectively, communicable with bores 75 and 75' for exhausting the pressure chambers 3 or 4 through bores 74, 74'. It will be understood that the bores 74, 74' are connected with a common exhaust such as 37, as shown in the previous modification.

Stop elements similar to those hereinabove described, such as 76 and 76', are used for engagement with respective cam portions 63 and 63' of the lever. The stop elements are in all respects similar to those hereinabove described and therefore such description need not be repeated herein. However, it will be apparent that each stop element and its accompanying lever arrangement forms a control system for the respective valve in order to exhaust a respective cylinder end.

Figure 8:
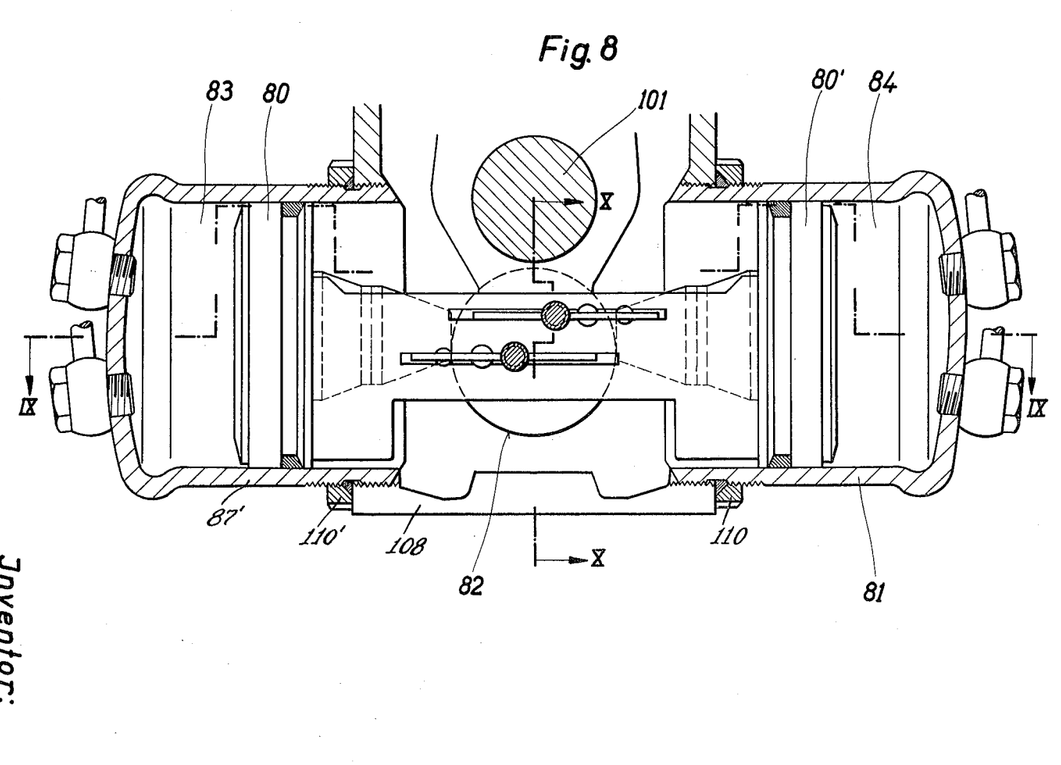
FIG. 8 is a longitudinal section of a further modification taken on the line VIII—VIII of FIG. 9.
Figure 9:
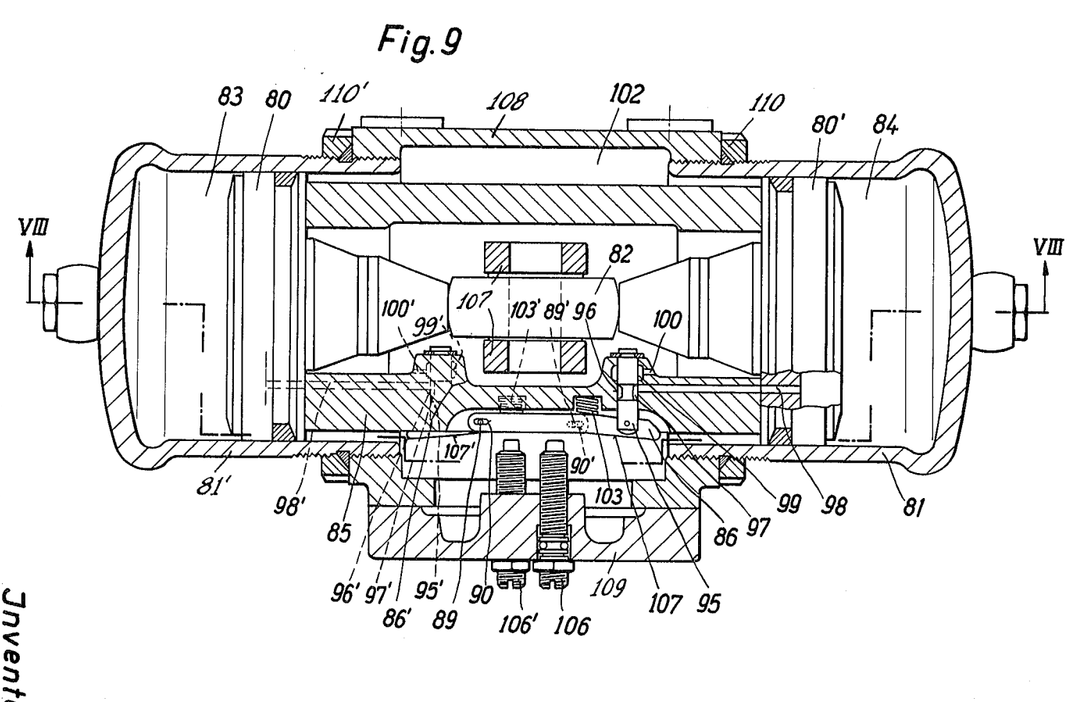
FIG. 9 is a section taken on the line IX—IX of FIG. 8.
Figure 9A:
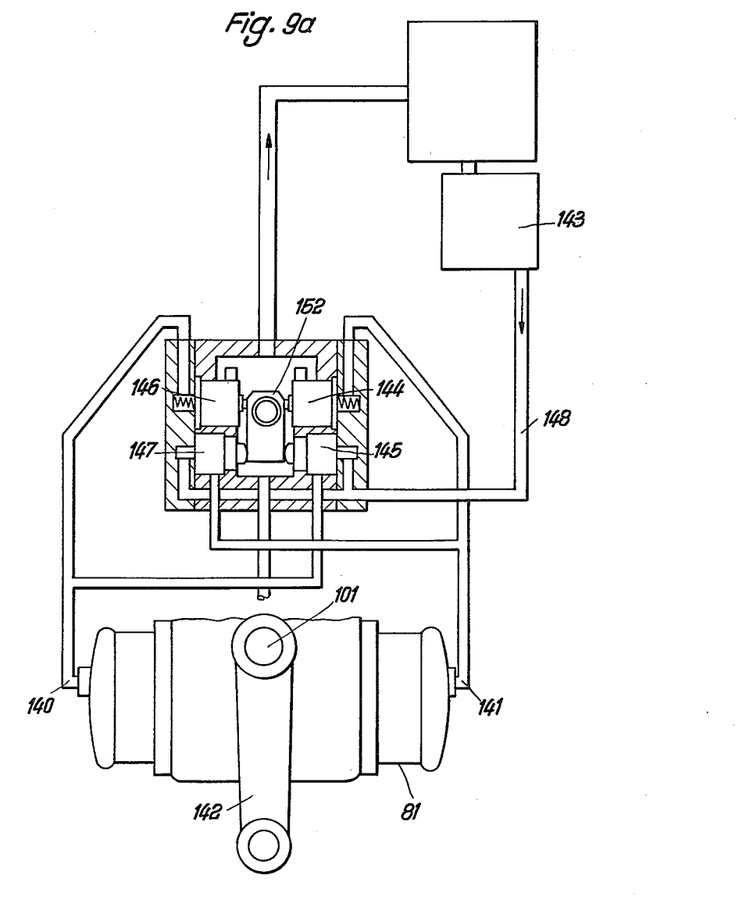
FIG. 9a is a diagrammatic view of the oil-system.
Figure 9B:
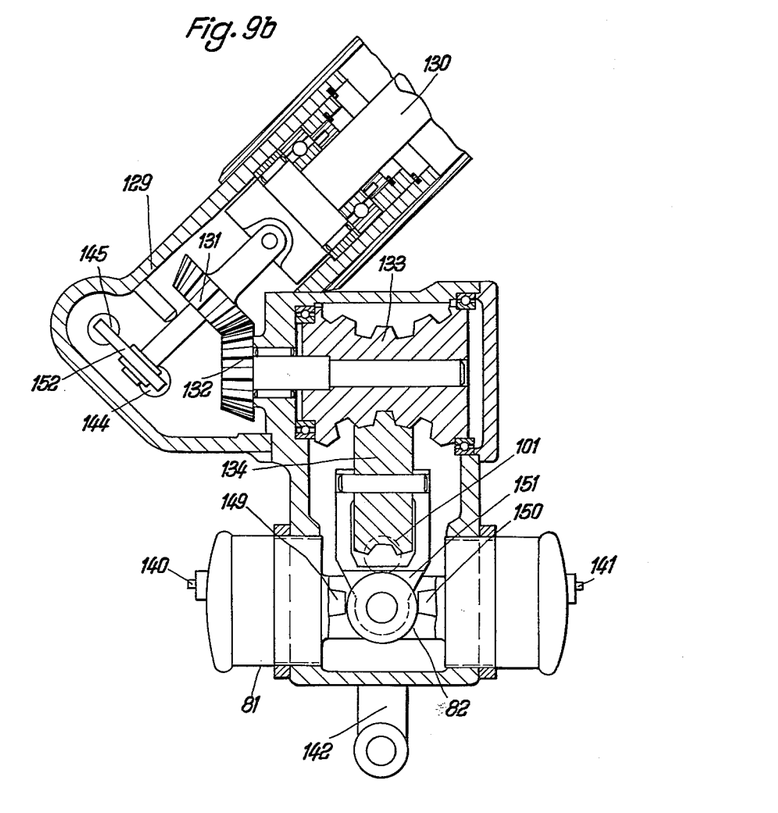
FIG. 9b is a diagrammatic section through the steering mechanism.
Figure 10:
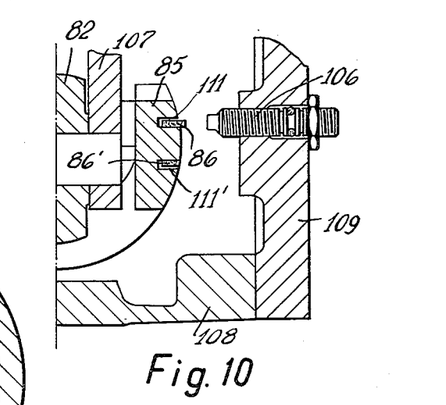
FIG. 10 is a partial section taken on the line X—X of FIG. 8.

In the form of the invention shown in FIGS. 8 to 10, a somewhat different type of piston and cylinder arrangement is used wherein the piston acts on a pressure roller 82 by means of abutment cones 149 and 150 as shown. Roller 82 is mounted in fork 107 of steering shaft 101, FIG. 9. Thus, the pressure roller (FIG. 9b) is carried by a bracket 151 secured to the steering shaft 101 and is moved by pistons 80, 80', which are joined by sleeve 85. Depending upon the direction of rotation of the steering shaft, pressure fluid is fed either to chamber 83 or 84 of cylinders 81 or 81' by a pump 143 through conduit 148, valves 144 and 145, or valves 146 and 147, and conduits 140 or 141. The valves are controlled by a steering arm 152 (FIG. 9b). The cylinders are secured by threaded rings 110, 110', respectively, to cylinder body 108.

FIG. 9b shows the housing 129 of the steering mechanism which comprises the steering rod 130, a pair of bevel gears 131, 132, the steering arm 152, the worm drive 133 and 134, and the bracket 151 including roller 82, steering shaft 101 and steering lever 142. The functioning of the steering gear as represented in FIGS. 9a and 9b is described in detail in my patent applications S. N. 551,432 filed December 6, 1955, now Patent No. 2,906,136 and S. N. 824,736, filed July 2, 1959, now Patent No. 3,032,014.

Levers 86 and 86' (FIGS. 8–10) are carried within respective suitable slots 111, 111' in the piston, being pivoted thereto as by respective pins 89 and 89', which protrude into the intermediate section 85 of the piston. The levers are provided with elongated slots 90 and 90' respectively, which co-act with the respective pins so as to permit a certain amount of endwise play. Each lever is biased away from the piston by respective springs 103 and 103'. Valves 95 and 95' are provided for the respective levers, the valves being of the usual spool or piston type and being slidable within respective bores 96 and 96' and having respective recesses 97 and 97' for the purpose of connecting respective pressure chambers 83 and 84 via respective channels 98 and 98', annular recesses 99 and 99' to bores 100 and 100' to a common return chamber 102. Respective adjustable stop elements 106 and 106' are provided carried by the wall 109 of cylinder body 108 for the purpose of co-acting with respective cam portions 107 and 107' to effect rocking of respective levers, articulated to respective valves for the purpose of exhausting respective pressure chambers.

The modifications shown in FIGS. 6 and 7 and 8 through 10, of course, operate in the same manner as hereinabove described for the operation of the form shown in FIGS. 1 through 4.

It will thus be apparent from the above description of the several forms of the invention that I have provided an arrangement which, in broad concept, is capable of precluding power boost in a steering mechanism at any desired point in the traverse of a power boost piston operating under fluid pressure. While I am aware that various changes may be made without departing from the spirit thereof, I do not seek to be limited to the precise illustration herein given except as set forth in the appended claims.

I claim:

1. In a power booster steering system, a cylinder having a pressure chamber, a power booster piston movable in said cylinder by fluid pressure in said cylinder acting on said piston, and relief means for relieving said fluid pressure prior to said piston traversing a full stroke, a steering element actuated by said piston, said system having an exhaust passage, said relief means comprising a normally closed valve, a passage controlled by said valve for effecting communication between said pressure chamber and said exhaust passage, and control means for moving said valve to open position responsive to a predetermined position of said piston in moving through a power boosting stroke, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

2. In a power booster steering system, a cylinder having a pressure chamber, a power booster piston movable in said cylinder by fluid pressure in said cylinder acting on said piston, and relief means for relieving said fluid pressure prior to said piston traversing a full stroke, a steering element actuated by said piston, said system having an exhaust passage, said relief means comprising a normally closed valve, a passage controlled by said valve for effecting communication between said pressure chamber and said exhaust passage, and control means for moving said valve to open position responsive to a predetermined position of said piston in moving through a power boosting stroke, said control means comprising a stop element having a fixed position whereby said piston has motion relative thereto, and said control means comprising actuating means intermediate said valve and said stop element and actuatable thereby for opening said valve when said piston reaches said predetermined position, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

3. In a power booster steering system, a cylinder having a pressure chamber, a power booster piston movable in said cylinder by fluid pressure in said cylinder acting on said piston, and relief means for relieving said fluid pressure prior to said piston traversing a full stroke, a steering element actuated by said piston, said system having an exhaust passage, said relief means comprising a normally closed valve, a passage controlled by said valve for effecting communication between said pressure chamber and said exhaust passage, and control means for moving said valve to open position responsive to a predetermined position of said piston in moving through a power boosting stroke, said control means comprising a stop element having a fixed position whereby said piston has motion relative thereto, and said control means comprising actuating means intermediate said valve and said stop element and actuatable thereby for opening said valve when said piston reaches said predetermined position, said control means and said valve being carried by said piston, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

4. In a power booster steering system, a cylinder having a pressure chamber, a power booster piston movable in said cylinder by fluid pressure in said cylinder acting on said piston, and relief means for relieving said fluid pressure prior to said piston traversing a full stroke, a steering element actuated by said piston, said system having an exhaust passage, said relief means comprising a normally closed valve, a passage controlled by said valve for effecting communication between said pressure chamber and said exhaust passage, and control means for moving said valve to open position responsive to a predetermined position of said piston in moving through a power boosting stroke, said control means comprising a stop element having a fixed position whereby said piston has motion relative thereto, and said control means comprising actuating means intermediate said valve and said stop element and actuatable thereby for opening said valve when said piston reaches said predetermined position, said control means and said valve being carried by said piston, said actuating means comprising a lever pivotally joined to said piston, and being engageable by said stop element as said piston moves, said lever being thus rocked, said valve being opened in response to said rocking, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

5. In a power booster steering system, a cylinder having a pressure chamber, a power booster piston movable in said cylinder by fluid pressure in said cylinder acting on said piston, and relief means for relieving said fluid pressure prior to said piston traversing a full stroke, a steering element actuated by said piston, said system having an exhaust passage, said relief means comprising a normally closed valve, a passage controlled by said valve for effecting communication between said pressure chamber and said exhaust passage, and control means for moving said valve to open position responsive to a predetermined position of said piston in moving through a power boosting stroke, said control means comprising a stop element having a fixed position whereby said piston has motion relative thereto, and said control means comprising actuating means intermediate said valve and said stop element and actuatable thereby for opening said valve when said piston reaches said predetermined position, said control means and said valve being carried by said piston, said actuating means comprising a lever pivotally joined to said piston, and being engageable by said stop element as said piston moves, said lever being thus rocked, said valve being opened in response to said rocking, said lever having a cam portion engageable with said stop element, and having spring means for biasing said cam portion toward said stop element, said valve having a reciprocal stem engaged by said lever and actuated by rocking of said lever, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

6. In a power booster steering system, a cylinder having a pressure chamber, a power booster piston movable in said cylinder by fluid pressure in said cylinder acting on said piston, and relief means for relieving said fluid pressure prior to said piston traversing a full stroke, a steering element actuated by said piston, said system having an exhaust passage, said relief means comprising a normally closed valve, a passage controlled by said valve for effecting communication between said pressure chamber and said exhaust passage, and control means for moving said valve to open position responsive to a predetermined position of said piston in moving through a power boosting stroke, said control means comprising a stop element, having a fixed position whereby said piston has motion relative thereto, and said control means comprising actuating means intermediate said valve and said stop element and actuatable thereby for opening said valve when said piston reaches said predetermined position, said actuating means comprising a lever pivotally joined to said piston, and being engageable by said stop element as said piston moves, said lever being thus rocked, said valve being opened in response to said rocking, said stop element comprising a pin disposed in the plane of motion of said lever and engageable with said cam surface, said pin being adjustable so as to effect a variation of the point in piston traverse at which opening of said valve occurs, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

7. In a power boosting steering system, a double-ended cylinder for receiving pressure fluid, and having a pair of pressure chambers; a double-faced piston in said cylinder, each face being exposed to a pressure chamber, said piston being formed with an intermediate body section, a pair of lever means pivoted to said body section adjacent a respective end thereof, a valve carried by said body section adjacent each end thereof and actuatable by respective lever means, means for communicating a respective pressure chamber with a respective valve for exhausting said chamber and a respective stop element carried by said cylinder disposed for engagement with respective lever means for rocking said lever means to actuate said valve at predetermined points in the path of movement of said piston in either direction, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits.

8. In a power boosting steering system, a double-ended cylinder for receiving pressure fluid, and having a pair of pressure chambers; a double-faced piston in said cylinder, each face being exposed to a pressure chamber, said piston being formed with an intermediate body section, a pair of lever means pivoted to said body section adjacent a respective end thereof, a valve carried by said body section adjacent each end thereof and actuatable by respective lever means, means for communicating a respective pressure chamber with a respective valve for exhausting said chamber and a respective stop element carried by said cylinder disposed for engagement with respective lever means for rocking said lever means to actuate said valve at predetermined points in the path of movement of said piston in either direction, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits, said lever means being arranged so as to extend in a generally longitudinal direction relative the axis of said piston and said valves being reciprocal and disposed to reciprocate in planes generally normal to the axis of said piston, said lever means being arranged so as to extend in a generally longitudinal direction relative the axis of said piston and said valves being reciprocal and disposed to reciprocate in planes generally normal to the axis of said piston.

9. In a power boosting steering system, a double-ended cylinder for receiving pressure fluid, and having a pair of pressure chambers; a double-faced piston in said cylinder, each face being exposed to a pressure chamber, said piston being formed with an intermediate body section, a pair of lever means pivoted to said body section adjacent a respective end thereof, a valve carried by said body section adjacent each end thereof and actuatable by respective lever means, means for communicating a respective pressure chamber with a respective valve for exhausting said chamber and a respective stop element carried by said cylinder disposed for engagement with respective lever means for rocking said lever means to actuate said valve at predetermined points in the path of movement of said piston in either direction, and a manually actuatable steering rod and means intermediate said rod and said piston wherein actuation of said rod effects movement of said piston by manual force for extreme limits of steering subsequent to relief of said fluid pressure to avoid power booster force being effective at said extreme limits, said lever means being arranged so as to extend in a generally longitudinal direction relative the axis of said piston and said valves being reciprocal and disposed to reciprocate in planes generally normal to the axis of said piston, each of said lever means comprising a pair of levers pivotally related to each other, one of said levers being pivoted to the casing and having a cam portion engageable with said stop element, and the other of said levers being a bell crank and being pivoted to said casing and to said first lever and having an end engaging a respective valve, said valves being reciprocal in a direction generally parallel to the axis of said piston.

10. In a device as set forth in claim 7, including respective spring means for biasing respective lever means toward respective stop elements.

11. In a device as set forth in claim 7, wherein each of said stop elements comprises threaded components for effecting adjustability so as to predetermine the point of engagement between respective stop elements and respective levers.

References Cited in the file of this patent

UNITED STATES PATENTS

| | | |
|---|---|---|
| 2,233,521 | Ernst et al. | Mar. 4, 1941 |
| 2,272,033 | Buckmann | Feb. 3, 1942 |
| 2,292,916 | Wheelon | Aug. 11, 1942 |
| 2,788,770 | Folkerts | Apr. 16, 1957 |

UNITED STATES PATENT OFFICE
CERTIFICATE OF CORRECTION

Patent No. 3,047,087                  July 31, 1962

Erich Jablonsky

It is hereby certified that error appears in the above numbered patent requiring correction and that the said Letters Patent should read as corrected below.

In the grant, lines 1 to 3, for "Erich Jablonsky, of Schwabisch-Gmund, Germany," read -- Erich Jablonsky, of Schwabisch-Gmund, Germany, assignor to Zahnradfabrik Friedrichshafen, Aktiengesellschaft, of Friedrichshafen, a. B., Germany, --; line 12, for "Erich Jablonsky, his heirs" read -- Zahnradfabrik Friedrichshafen, Aktiengesellschaft, its successors --; in the heading to the printed specification, lines 3 and 4, for "Erich Jablonsky, Albstrasse 80, Schwabisch-Gmund, Germany" read -- Erich Jablonsky, Schwabisch-Gmund, Germany, assignor to Zahnradfabrik Friedrichshafen, Aktiengesellschaft, Friedrichshafen, a. B., Germany --.

Signed and sealed this 8th day of January 1963.

(SEAL)
Attest:

ERNEST W. SWIDER                                DAVID L. LADD Attesting Officer                                     Commissioner of Patents